United States Patent
Le et al.

(10) Patent No.: US 9,180,834 B1
(45) Date of Patent: Nov. 10, 2015

(54) VEHICLE OCCUPANT RESTRAINT SYSTEM FOR OBLIQUE IMPACT

(71) Applicant: Ford Global Technologies, LLC, Dearborn, MI (US)

(72) Inventors: Jialiang Le, Canton, MI (US); Manoharprasad K. Rao, Novi, MI (US); Robert William McCoy, Ann Arbor, MI (US); James Chih Cheng, Troy, MI (US)

(73) Assignee: FORD GLOBAL TECHNOLOGIES, LLC, Dearborn, MI (US)

( * ) Notice: Subject to any disclaimer, the term of this patent is extended or adjusted under 35 U.S.C. 154(b) by 0 days.

(21) Appl. No.: 14/288,221

(22) Filed: May 27, 2014

(51) Int. Cl.
| | |
|---|---|
| *B60R 21/203* | (2006.01) |
| *B60R 21/231* | (2011.01) |
| *B60R 21/215* | (2011.01) |
| *B60R 21/00* | (2006.01) |

(52) U.S. Cl.
CPC ............ *B60R 21/231* (2013.01); *B60R 21/203* (2013.01); *B60R 21/215* (2013.01); *B60R 2021/0009* (2013.01); *B60R 2021/23107* (2013.01)

(58) Field of Classification Search
CPC ............ B60R 21/23138; B60R 21/203; B60R 21/2035; B60R 21/215; B60R 2021/161; B60R 21/2165; B60R 2021/0009
USPC ............................. 280/728.3, 729, 731, 743.2
See application file for complete search history.

(56) References Cited

U.S. PATENT DOCUMENTS

| | | | |
|---|---|---|---|
| 5,492,361 A | 2/1996 | Kim | |
| 5,630,614 A * | 5/1997 | Conlee et al. | 280/730.1 |
| 6,669,229 B2 * | 12/2003 | Thomas | 280/732 |
| 6,702,322 B2 | 3/2004 | Eyrainer et al. | |
| 7,731,229 B2 | 6/2010 | Song et al. | |
| 8,297,648 B2 | 10/2012 | Komoll et al. | |
| 8,322,769 B2 | 12/2012 | Kuhlmann | |
| 2002/0089152 A1 * | 7/2002 | Khoudari et al. | 280/728.2 |
| 2005/0275199 A1 * | 12/2005 | Helmstetter | 280/730.1 |
| 2005/0275201 A1 * | 12/2005 | Schneider et al. | 280/731 |
| 2006/0163848 A1 * | 7/2006 | Abe | 280/729 |
| 2006/0197324 A1 * | 9/2006 | Klinkenberger | 280/731 |
| 2009/0212974 A1 | 8/2009 | Chiba et al. | |
| 2011/0022275 A1 | 1/2011 | Oosaki | |

FOREIGN PATENT DOCUMENTS

| | | |
|---|---|---|
| DE | 10021845 | 11/2001 |
| DE | 102004011369 A1 * | 10/2005 |
| JP | 2013047026 | 3/2013 |

* cited by examiner

*Primary Examiner* — Karen Beck
(74) *Attorney, Agent, or Firm* — Frank A. MacKenzie; Bejin Bieneman PLC

(57) ABSTRACT

An occupant restraint system for a vehicle includes an airbag module disposed in a column cover. The column cover covers a steering column of the vehicle. The airbag module includes an inflator within the column cover and an airbag coupled to the inflator. The airbag is moveable between a deflated position within the cover and a deployed position exiting the cover to the left and upwardly for deployment toward an A-pillar of the vehicle during an oblique impact.

20 Claims, 5 Drawing Sheets

VEHICLE OCCUPANT RESTRAINT SYSTEM FOR OBLIQUE IMPACT

BACKGROUND

Vehicles include airbags to restrain occupants during vehicle impacts. Vehicles can include a plurality of different types of airbags in different locations of the vehicle to restrain the occupants during a variety of impact types. For example, the vehicle can include a front driver airbag deployed from the steering wheel, a front passenger airbag deployed from the instrument panel, side curtain airbags deployed from the roof or door of the vehicle, etc. The combination of various types of airbags can be deployed to restrain occupants during several impact types such as front impacts, side impacts, rear impacts, rollovers, etc.

Another type of impact that the vehicle may be subjected to is an oblique impact. An oblique impact can be an impact at an angle between the vehicle and object. The vehicle can partially overlap the object during the oblique impact. For example, a crash test for oblique impact involves an impact with the vehicle at a 15 degree angle relative to the deformable moving barrier with 35% of the vehicle overlapping the barrier. During this test, the vehicle may be arranged relative to the deformable moving barrier such that the driver side front corner, i.e., the left side front corner, of the vehicle first impacts the barrier.

During an oblique impact, a driver of the vehicle may move forward and to the left toward an A-pillar of the vehicle, i.e., the front driver side pillar of the vehicle. During this movement, the front driver airbag may restrain the driver. However, due to the angular motion of the driver during the oblique impact, the driver may slide along the airbag toward the A-pillar. In addition to, or in the alternative to, restraint by the front driver airbag, the driver side curtain airbag may restrain the driver. However, a gap may still remain between the front driver airbag and the driver side curtain airbag.

One solution to restrain the driver from the A-pillar is the addition of an airbag in the A-pillar. During the oblique impact, the airbag may be deployed to restrain the driver as the driver moves toward the A-pillar. However, the airbag in the A-pillar results in an increase in the size of the A-pillar. This increased size is undesirable because this increase in size of the A-pillar may increase blind spots and may be unaesthetic.

Accordingly, there remains an opportunity to design a system directed toward restraining a driver of a vehicle from impacting the A-pillar of the vehicle during an oblique impact.

DETAILED DESCRIPTION

Figure 2:
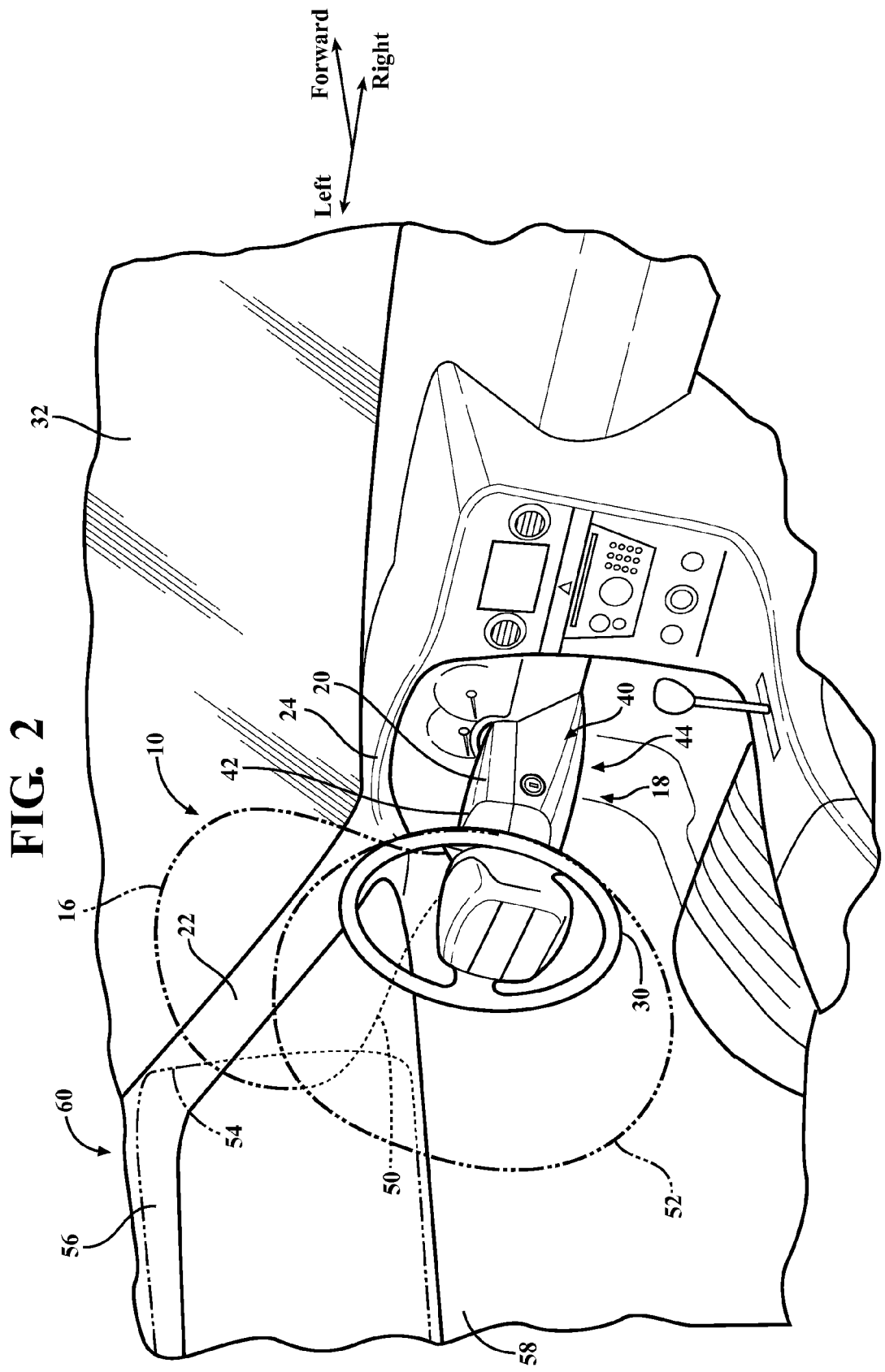
FIG. 2 is a perspective view of an interior of the vehicle showing the airbag on the steering column, the driver front airbag, and the side curtain airbag.
Figure 3:
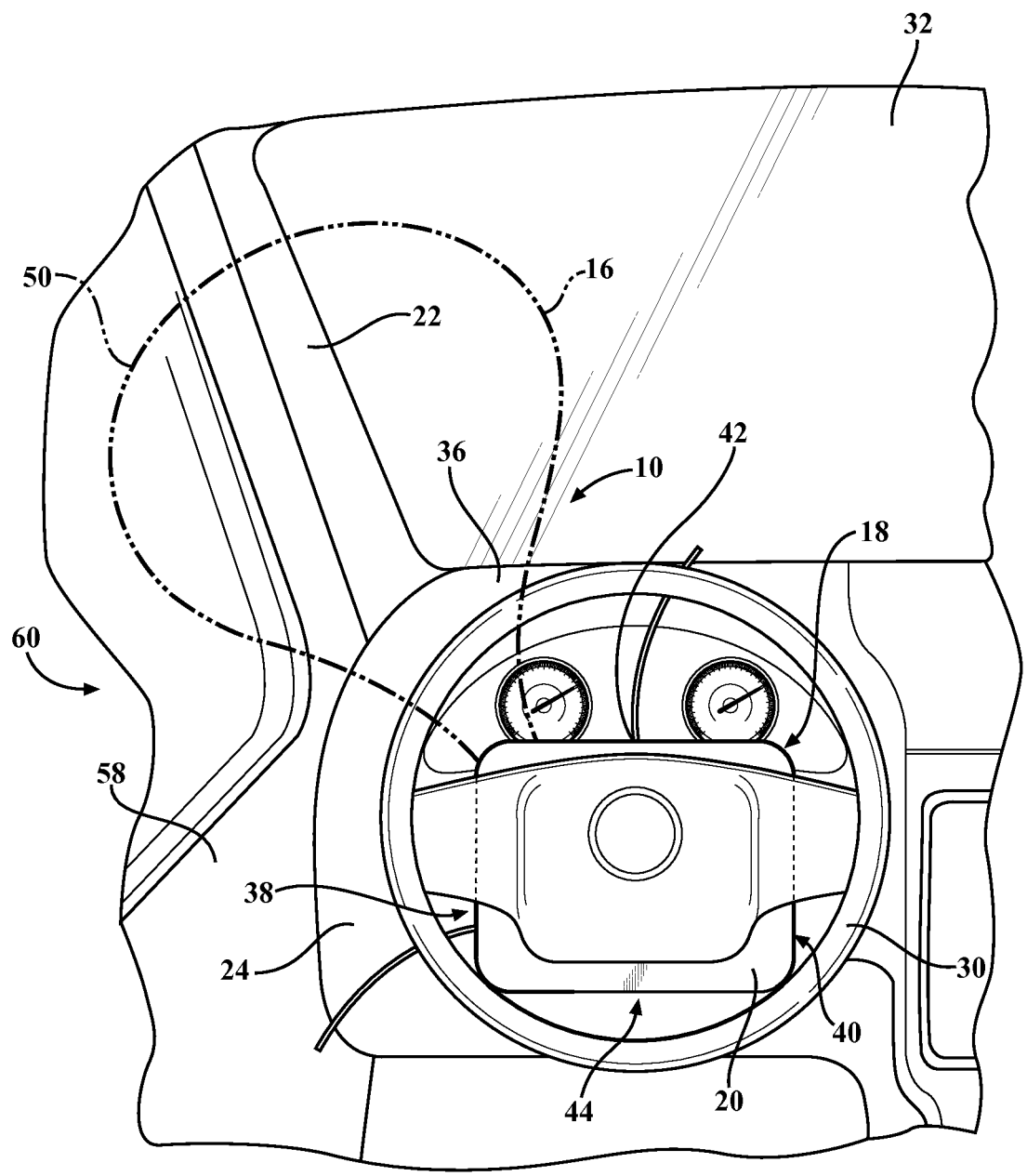
FIG. 3 is a view of an interior of the vehicle from the perspective of the driver with the airbag deployed from the steering column toward the A-pillar.

With reference to the Figures, wherein like numerals indicate like parts throughout the several views, an occupant restraint system 10 for a vehicle includes an airbag module 12 including an inflator 14 and an airbag 16. With reference to FIGS. 2-5, the vehicle includes a steering column 18 and a column cover 20 that covers the steering column 18. The inflator 14 is disposed within the column cover 20 and the airbag 16 is coupled to the inflator 14. The airbag 16 is moveable between a deflated position within the column cover 20 and a deployed position exiting the cover to the left and upwardly for deployment toward a left side A-pillar 22 of the vehicle, as shown in FIGS. 2 and 3, during an oblique impact of the vehicle.

During an oblique impact of the vehicle, the driver may move forward and left toward the left side A-pillar 22 of the vehicle due to the angular forces involved in the oblique impact. Since the airbag 16 exits the cover to the left and upwardly toward the left side A-pillar 22 in the deployed position, the airbag 16 restrains the driver from the left side A-pillar 22 during the oblique impact of the vehicle. Due to the location of the airbag 16 within the column cover 20, the airbag 16 restrains the driver from the lefts side A-pillar 22 without affecting the size of the left side A-pillar 22 and without consuming valuable areas of the vehicle, such as a portion of the instrument panel 24, which can be used to house other instruments, gauges, dials, etc.

The steering column 18 of the vehicle may be of any suitable type including, for example, a tilting and/or telescoping steering columns. The steering column 18, for example, may include a housing 26 and a steering shaft 28 rotatably supported by the housing 26. The housing 26, for example, may be mounted to the instrument panel 24. The housing 26 may be configured to allow for selective tilting and/or telescoping of the steering shaft 28.

The steering column 18 is configured to support the airbag module 12 in the proper position such that the airbag 16 extends toward the left side A-pillar 22 in the deployed position. The inflator 14 of the airbag module 12 may, for example, be fixed to a portion of the steering column 18 that is stationary relative to the instrument panel 24, e.g., a stationary portion of the housing 26. Alternatively, the inflator 14 may be supported in a proper location in any suitable fashion.

Figure 1:
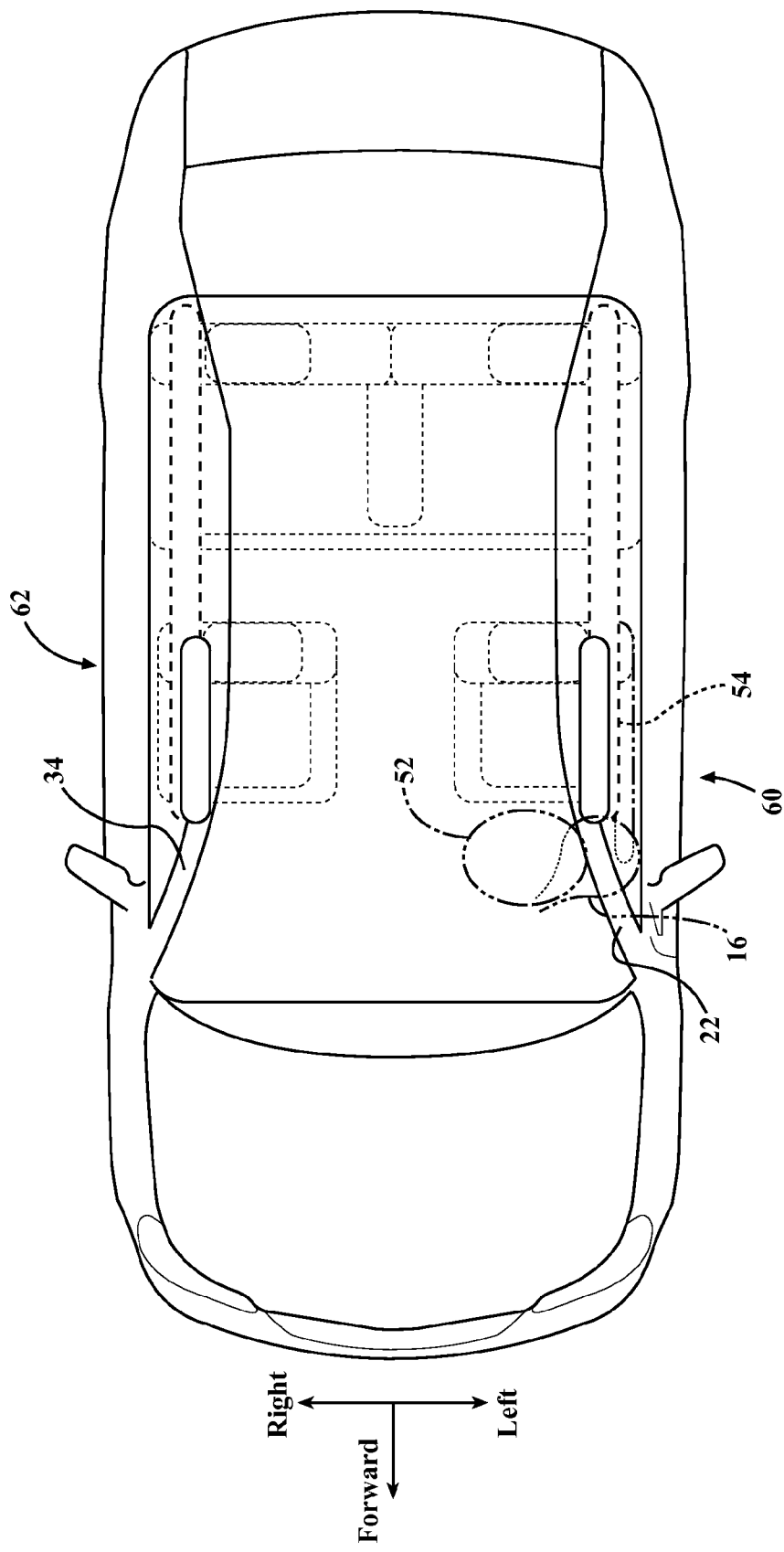
FIG. 1 is a plan view of a vehicle including an airbag deployed from a column cover on a steering column toward an A-pillar of the vehicle, a driver front airbag deployed from a steering wheel, and a side curtain airbag.

With reference to FIGS. 1 and 2, a steering wheel 30 is mounted on the steering column 18 for steering the vehicle. Specifically, the steering wheel 30 is mounted to the steering shaft 28. The steering wheel 30 may be of any suitable type.

With reference to FIGS. 1-3, the "A-pillars" of the vehicle are the first pillars at the front of the vehicle adjacent a windshield 32 of the vehicle. As shown in FIG. 1, the vehicle includes two A-pillars, specifically, the left side A-pillar 22, i.e., on the driver side of the vehicle, and a right side A-pillar 34, i.e., on the passenger side of the A-pillar. Consistent with the nomenclature used throughout this disclosure, the directions "left," "right," and "upwardly" are identified in FIG. 2 and refer to the directions relative to a forward-facing driver of the vehicle. As set forth above, the airbag 16 extends from the column cover 20 toward the left side A-pillar 22, i.e., from the column cover 20 to the left and upwardly.

The windshield 32 extends across the front of the vehicle from the left side A-pillar 22 to the right side A-pillar 34. The instrument panel 24 may extend from the left side A-pillar 22 to the right side A-pillar 34 below the windshield 32. The instrument panel 24 defines a top 42 surface 36 that may abut the airbag 16 when the airbag 16 is in the deployed position, as set forth further below.

The column cover 20 is supported by the steering column 18 and may be coupled to the steering column 18 in any suitable fashion. The column cover 20 may, for example, be fixed to the housing 26 of the steering column 18 and/or may be fixed to the instrument panel 24. The column cover 20 may be formed of any suitable material such as plastic, vinyl, etc. The column cover 20 may be of any cross-sectional shape. For example, the cross-section of the column cover 20 may be generally rectangular, as best shown in FIG. 5, but alternatively may be round, oval, etc.

Figure 4:
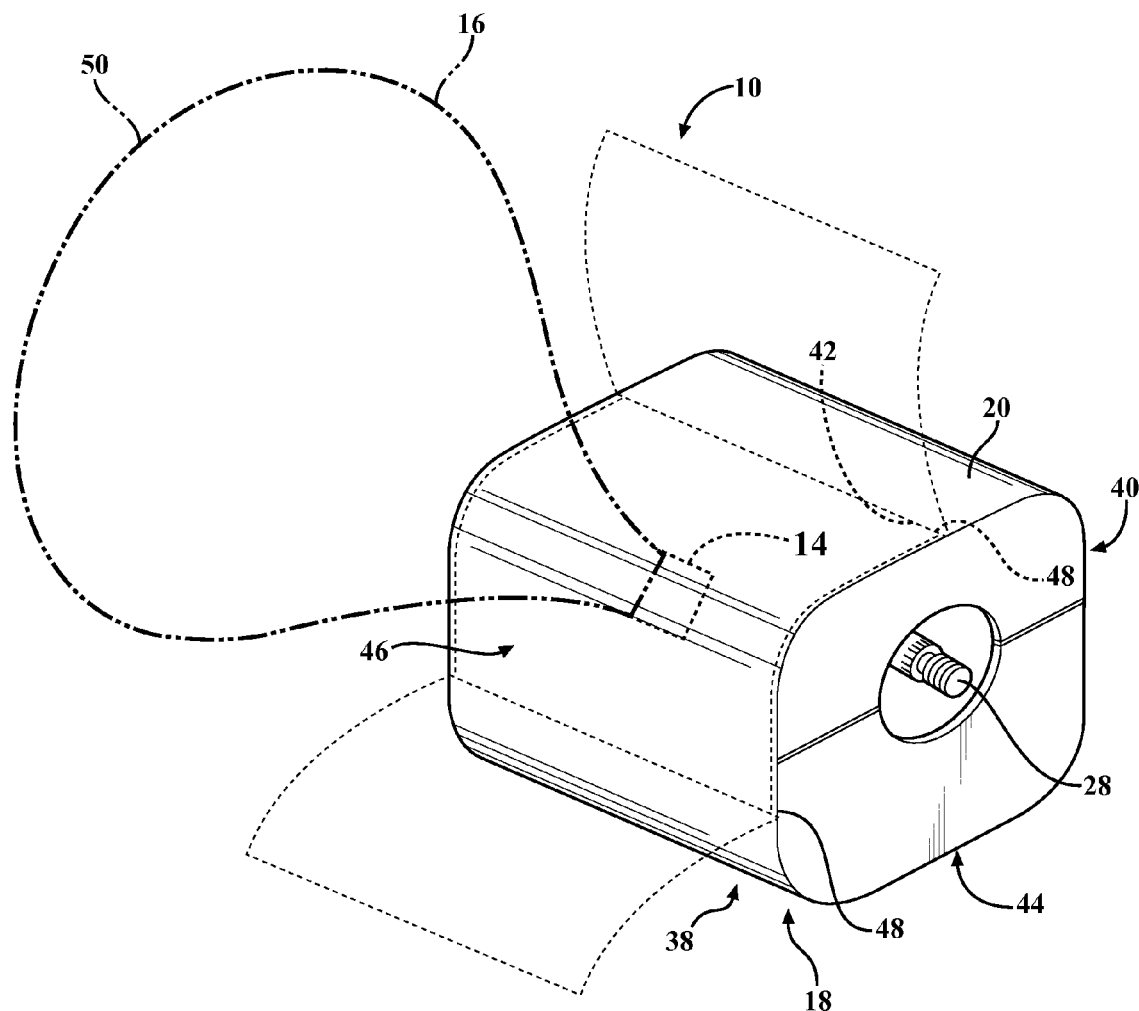
FIG. 4 is a perspective view of the column cover with the airbag shown deployed in broken lines.
Figure 5:
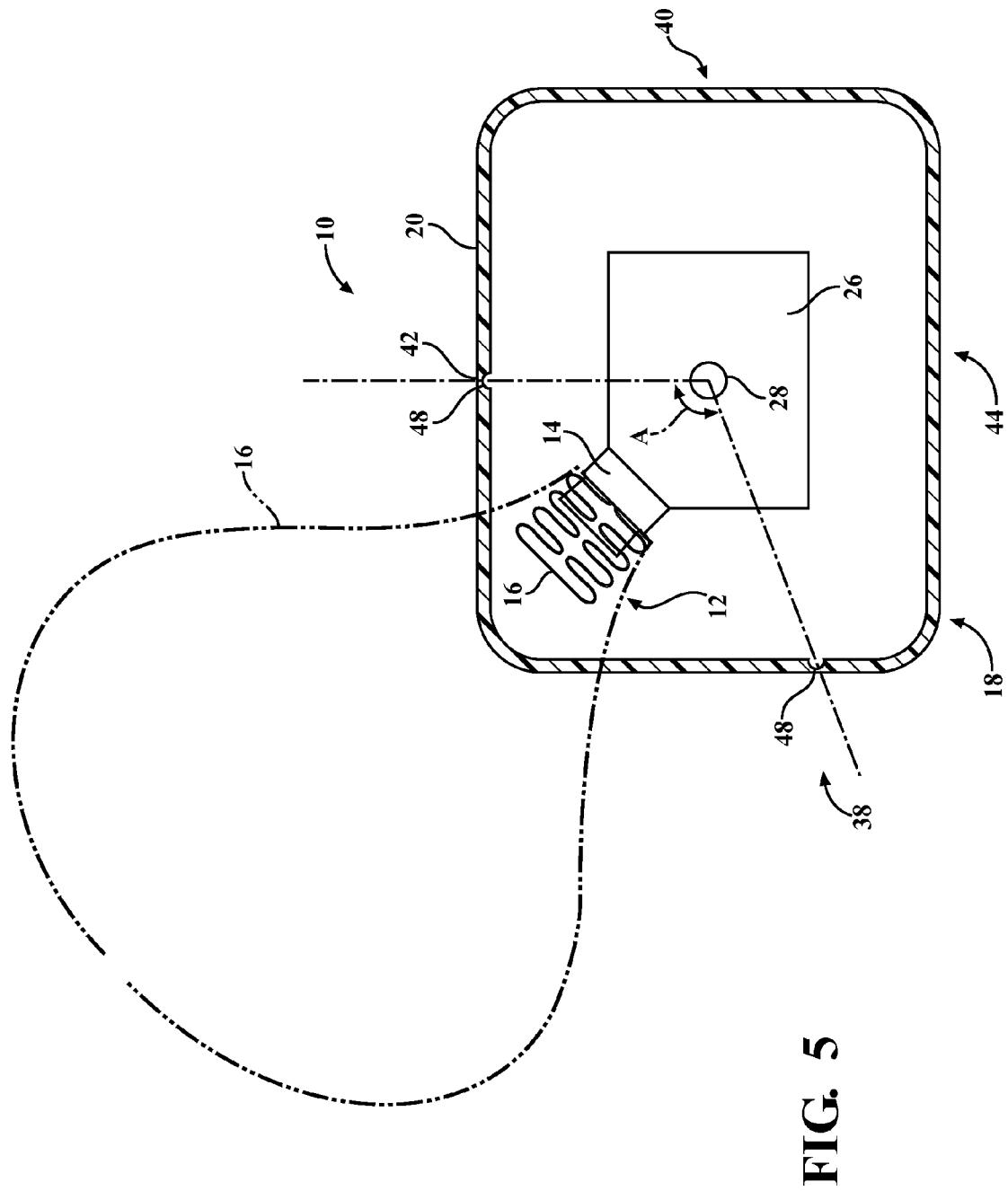
FIG. 5 is a cross-sectional view of the column cover with the airbag deployed from the column cover.

With reference to FIGS. 4 and 5, the column cover 20 includes a cover left side 38 for facing to the left in the vehicle, i.e., facing a vehicle left side 60, and a cover right side 40 for facing to the right in the vehicle, i.e., facing a vehicle right side 62. The column cover 20 includes a top 42 and a bottom 44. The top 42 of the column cover 20 faces upwardly. As set forth above, the column cover 20 may have any suitable cross-sectional shape, including round and oval, and in any event has the top 42 and the cover left side 38.

With reference to FIGS. 3-5, the column cover 20 defines an opening 46 on the cover left side 38 when the airbag 16 is in the deployed position. Specifically, upon inflation from the deflated position to the deployed position, the airbag 16 breaks the column cover 20 to form the opening 46.

With reference to FIG. 5, the opening 46 can be defined to the left of the top 42. For example, the opening 46 can be defined at a location between 0 and −120 degrees from the top 42. In other words, the opening 46 can be of any size, i.e., at any angle A, and at any position between 0 and −120 degrees from the top 42.

As shown in FIG. 5, the opening 46 can extend along the angle A. For example, the opening 46 shown in FIG. 5 extends along 120 degrees of the column cover 20 from 0 to −120 degrees from the top 42. However, it should be appreciated that the angle A of the opening 46 may be less than 120 degrees, in which case the opening 46 is disposed at a location between 0 and −120 degrees from the top 42.

With reference to FIG. 5, the column cover 20 may include weakened features 48 for defining the opening 46 during inflation of the airbag 16. In other words, the weakened features 48 encourage breakage of the column cover 20 at the opening 46 so as the airbag 16 inflates so as to define the opening 46 at a predetermined location, e.g., between 0 and −120 degrees from the top 42, as described above. The weakened features 48 are configured to define the opening 46. For example, as shown in FIG. 5, the weakened features 48 may be areas of decreased thickness. The weakened feature may, for example, extend around the perimeter of the opening 46 and/or may extend across a portion of the column cover 20 that is broken to define the opening 46

The weakened features 48 shown in FIG. 5 may be, for example, tear lines configured to tear when the airbag 16 inflates to the deployed position. In other words, the airbag 16 applies sufficient force against the column cover 20 during inflation to tear the column cover 20 at the tear lines. The tear lines may be an area of decreased thickness, as set forth above.

In the addition to, or in the alternative to, the tear lines, the weakened features 48 shown in FIG. 5 may be, for example, bend lines configured to bend when the airbag 16 inflates to the deployed position. In other words, the airbag 16 applies sufficient force against the column cover 20 during inflation to bend the column cover 20 at the bend lines. The bend lines may be an area of decreased thickness, as set forth above.

The weakened features 48 are configured to define the opening 46 at the predetermined position, e.g., between 0 and −120 degrees from the top 42 as set forth above. In the configuration shown in FIG. 5, for example, the weakened features 48 are disposed at 0 degrees from the top 42 and at −120 degrees from the top 42 such that, upon inflation of the airbag 16, the opening 46 is defined from 0 degrees to −120 degrees from the top 42. As shown in FIG. 4, the weakened features 48 may be configured such that any broken portion of the column cover 20 remain attached to the rest of the column cover 20.

The inflator 14 may be of any suitable type. For example, the inflator 14 may inflate the airbag 16 in any suitable fashion such as cold gas, gyro technique micro gas generator, etc. When the airbag 16 is in the deflated position, the airbag 16 is folded in the column cover 20, as shown in FIG. 5, for example. The airbag 16 may be formed of any suitable material.

As set forth above, in the deployed position, the airbag 16 extends toward the left side A-pillar 22. The airbag 16 may extend to and abut the left side A-pillar 22 in the deployed position. In addition to, or in the alternative to, abutting the left side A-pillar 22, the airbag 16 may abut the instrument panel 24, driver side curtain airbag 54, side door 58, and/or the windshield 32 in the deployed position.

The airbag 16 may be teardrop shaped when in the deployed position. In other words, as shown in FIGS. 3 and 4, in the deployed position the airbag 16 is narrow at the column cover 20 and expands outwardly to a head 50. The head 50 may be round and bulbous in shape relative to the rest of the airbag 16. The airbag 16 tapers from the head 50 of the airbag 16 toward the column cover 20.

The airbag 16 may be one component of an airbag system of the vehicle. For example, the airbag system may include a driver front airbag 52 on the steering wheel 30 and/or a driver side curtain airbag 54. The driver front airbag 52 is deployed from the steering wheel 30 when the vehicle is subjected to predetermined impact conditions. The driver side curtain airbag 54 is deployed from a roof 56 or a door 58 of the vehicle. The airbag 16 is disposed between the driver front airbag 52 and the driver side curtain airbag 54, as shown in FIG. 1. The airbag 16 fills any gap that may be between the driver front airbag 52 and the driver side curtain airbag 54.

The vehicle includes an impact sensing system (not shown) having one or more sensors and a controller. The sensors sense impact conditions of the vehicle and, based on data from the impact sensors, the controller selectively instructs at least one of the airbag module 12 and modules associated with the driver front airbag 52, the driver side curtain airbag 54, and any other airbags to inflate the associated airbags in certain conditions. The impact sensing system may be configured to only instruct the airbag module 12 to inflate the airbag 16 only during an oblique impact of the vehicle. In other words, the impact sensing system may be configured not instruct the airbag module 12 to inflate the airbag 16 during other impacts such as front impacts, side impacts, rollovers, etc.

During an oblique impact, a method of operating the airbag module 12 includes deploying the airbag 16 of the airbag module 12 from the column cover 20 toward the vehicle left side 60 and upwardly. Specifically, the method includes deploying the airbag 16 toward the left side A-pillar 22. As set forth above, during an oblique impact of the vehicle, the driver may move forward and left toward the left side A-pillar 22 of the vehicle due to the angular forces involved in the oblique impact. The step of deploying the airbag 16 toward the left side A-pillar 22 during the oblique impact restrains the driver from the left side A-pillar 22. This is accomplished without affecting the size of the left side A-pillar 22 and without consuming valuable areas of the vehicle, such as a portion of the instrument panel 24, which can be used to house other instruments, gauges, dials, etc.

The method includes deploying the airbag 16 through the opening 46 on the cover left side 38 of the column cover 20. Specifically, the method includes deploying the airbag 16 through the opening 46 at a location between 0 and −120 degrees from the top 42 of the column cover 20.

The method may include deploying the airbag 16 toward the instrument panel 24 and/or the windshield 32 of the vehicle. Specifically, the airbag 16 may be deployed toward the side door 58, the instrument panel 24 and/or the windshield 32 such that the airbag 16 abuts the side door 58, the instrument panel 24 and/or the windshield 32 when in the deployed position.

In addition to the deployment of the airbag 16, the method may include deploying a driver front airbag 52 on the steering wheel 30 and/or deploying a driver side curtain airbag 54. Specifically, in such a configuration, the airbag 16 is deployed between the driver front airbag 52 and the driver side curtain airbag 54. The deployment of the airbag 16 between the driver front airbag 52 and the driver side curtain airbag 54 fills any gap that may be between the driver front airbag 52 and the driver side curtain airbag 54.

Specifically, the method includes sensing an impact condition with the sensors of the impact sensing system. If the impact sensing system senses an oblique impact, the method include instructing the inflator 14 to inflate the airbag 16 to the deployed position. The impact sensing system may also deploy the driver front airbag 52 and/or the driver side curtain airbag 54 during the oblique impact.

The disclosure has been described in an illustrative manner, and it is to be understood that the terminology which has been used is intended to be in the nature of words of description rather than of limitation. Many modifications and variations of the present disclosure are possible in light of the above teachings, and the invention may be practiced otherwise than as specifically described.

What is claimed is:

1. An occupant restraint system for a vehicle, the system comprising:
   a column cover for covering a steering column of the vehicle;
   an airbag module including an inflator within the column cover and an airbag coupled to the inflator;
   the airbag being moveable between a deflated position within the column cover and a deployed position exiting the column cover to the left and upwardly for deployment toward an A-pillar of the vehicle during an oblique impact.

2. The occupant restraint system as set forth in claim 1 wherein the column cover includes a cover left side for facing a vehicle left side and wherein the column cover defines an opening on the cover left side when the airbag is in the deployed position.

3. The occupant restraint system as set forth in claim 2 wherein the column cover includes a top and the opening is defined at a location between 0 and −120 degrees from the top.

4. The occupant restraint system as set forth in claim 1 wherein the airbag is teardrop shaped when in the deployed position.

5. A vehicle comprising:
   an A-pillar;
   a steering column;
   a column cover supported by the steering column;
   an airbag module including an inflator within the column cover and an airbag coupled to the inflator;
   the airbag being moveable between a deflated position within the column cover and a deployed position exiting the column cover to the vehicle left side and upwardly to the A-pillar for deployment during an oblique impact of the vehicle.

6. The vehicle as set forth in claim 5 wherein the column cover includes a cover left side facing the vehicle left side and defines an opening on the vehicle left side when the airbag is in the deployed position.

7. The vehicle as set forth in claim 6 wherein the column cover includes a top and the opening is defined at a location between 0 and −120 degrees from the top.

8. The vehicle as set forth in claim 5 further comprising a driver side door, an instrument panel, and a windshield and wherein the airbag abuts the driver side door, the instrument panel, and the windshield in the deployed position.

9. The vehicle as set forth in claim 5 wherein the airbag is teardrop shaped when in the deployed position.

10. The vehicle as set forth in claim 5 further comprising a steering wheel on the steering column and a front airbag on the steering wheel.

11. The vehicle as set forth in claim 10 further comprising a side curtain airbag with the airbag disposed between the side curtain airbag and the front driver airbag.

12. A method of operating an airbag module in a vehicle, the method comprising:
   providing the airbag module on a steering column of the vehicle with a column cover covering an inflator; and
   deploying an airbag of the airbag module from the column cover toward a vehicle left side and upwardly when the vehicle is involved in an oblique impact;
   wherein the airbag is deployed only when the vehicle is involved in the oblique impact.

13. The method as set forth in claim 12 further comprising deploying the airbag toward an A-pillar of the vehicle.

14. The method as set forth in claim 13 further comprising deploying the airbag toward a driver side door, an instrument panel, and a windshield of the vehicle.

15. The method as set forth in claim 12 further comprising a deploying a front driver airbag on the steering wheel.

16. The method as set forth in claim 15 further comprising deploying a side curtain airbag with the airbag between the front driver airbag and the side curtain airbag.

17. The method as set forth in claim 12 further comprising deploying the airbag through an opening on a left side of the cover.

18. The method as set forth in claim 17 further comprising deploying the airbag through an opening at a location between 0 and −120 degrees from a top of the column cover.

19. The occupant restraint system as set forth in claim 1 further comprising a steering wheel and a driver front airbag on the steering wheel.

20. The vehicle as set forth in claim 10 further comprising an impact sensing system configured to provide instruction to inflate at least one of the airbag and the driver front airbag based on impact conditions.

* * * * *